June 5, 1962 A. F. SMITH 3,037,688

PUNCHING MACHINES FOR PUNCHING RECORDS WHILE IN MOTION

Filed Dec. 8, 1958 11 Sheets-Sheet 1

INVENTOR.
ARTHUR F. SMITH

BY Frank W. Lounitzer
ATTORNEY.

June 5, 1962 A. F. SMITH 3,037,688

PUNCHING MACHINES FOR PUNCHING RECORDS WHILE IN MOTION

Filed Dec. 8, 1958 11 Sheets-Sheet 2

INVENTOR
ARTHUR F. SMITH

BY Frank W. Lowenitzer
ATTORNEY.

June 5, 1962 A. F. SMITH 3,037,688

PUNCHING MACHINES FOR PUNCHING RECORDS WHILE IN MOTION

Filed Dec. 8, 1958 11 Sheets-Sheet 3

INVENTOR.
ARTHUR F. SMITH

BY Frank W. Lonnitzer
ATTORNEY

June 5, 1962 A. F. SMITH 3,037,688

PUNCHING MACHINES FOR PUNCHING RECORDS WHILE IN MOTION

Filed Dec. 8, 1958 11 Sheets-Sheet 4

INVENTOR
ARTHUR F. SMITH

BY Frank W. Lowrutzle

ATTORNEY

June 5, 1962 A. F. SMITH 3,037,688

PUNCHING MACHINES FOR PUNCHING RECORDS WHILE IN MOTION

Filed Dec. 8, 1958 11 Sheets-Sheet 5

INVENTOR.
ARTHUR F. SMITH
BY Frank W. Lomnitzer
ATTORNEY

PUNCHING MACHINES FOR PUNCHING RECORDS WHILE IN MOTION

Filed Dec. 8, 1958 11 Sheets-Sheet 6

INVENTOR.
ARTHUR F. SMITH
BY Frank W. Lowenitzer
ATTORNEY.

INVENTOR.
ARTHUR F. SMITH
BY Frank W. Lowenitzer
ATTORNEY

June 5, 1962 A. F. SMITH 3,037,688

PUNCHING MACHINES FOR PUNCHING RECORDS WHILE IN MOTION

Filed Dec. 8, 1958 11 Sheets-Sheet 8

June 5, 1962 A. F. SMITH 3,037,688

PUNCHING MACHINES FOR PUNCHING RECORDS WHILE IN MOTION

Filed Dec. 8, 1958 11 Sheets-Sheet 10

PUNCHING MACHINES FOR PUNCHING RECORDS WHILE IN MOTION

Filed Dec. 8, 1958 11 Sheets-Sheet 11

United States Patent Office 3,037,688

Patented June 5, 1962

3,037,688

PUNCHING MACHINES FOR PUNCHING RECORDS WHILE IN MOTION

Arthur F. Smith, Endicott, N.Y., assignor to International Business Machines Corporation, New York, N.Y., a corporation of New York Filed Dec. 8, 1958, Ser. No. 778,815
27 Claims. (Cl. 234—50)

This invention relates to punching machines capable of perforating records, such as cards or the like, which perforated records are adapted to control other machines, such as statistical machines of the card controlled type.

The main object of the present invention is to devise improvements in a punching machine of the above-described type whereby said punching machine is capable of perforating cards or other forms of records at a higher speed than is now obtainable in commercial machines.

Statistical apparatus or machines such as sorting machines, accounting machines, collating machines, etc. are now capable of performing at relatively higher speeds than formerly and it is the object of this invention to devise by improved design and construction a record or card punching machine having a higher speed of output than is now possible in order not to slow down statistical apparatus operating at their higher speeds. Such increased speed of the punching machine and higher output now enables the flow of work without interruption from its source to the final result.

According to the present invention the machine includes a punching mechanism for punching a plurality of columns, to which punching mechanism records, such as cards are continuously fed, means to longitudinally reciprocate the punching mechanism at a rate which moves the punching mechanism in synchronism with card feed, and further the operation of means to automatically reciprocate the punches vertically to punch selected card columns while the card is in motion synchronously with the card.

Further, according to the invention the punching mechanism comprises a plurality of rows of punches which, with the correlated punch die, is assembled as a punch unit or assembly for longitudinal movement together in the direction of card feed, and to provide means to reciprocate the punch unit whereby said unit when restored to its normal or setup position remains stationary while the card to be punched is being fed to the punching mechanism to an extent necessary to correlate the selected columns of the card to be punched with the rows of punches.

Still further, according to the present invention, is the provision of a punch setup means comprising, as is known herein, an interposer unit which is also capable of vertical reciprocation to first receive the data setup and then transfer said setup to the punches, said transfer being preferably effected during the period that the punch unit is stationary or at its setup position. The machine further provides for immediate clearance or restoration of the latched interposers which have depressed the punches in order to prevent interference of latched interposers with the unset punches when said punch unit is longitudinally reciprocated.

Still further the invention contemplates the provision of means cooperating with the frame which carries said punches to reciprocate the latched punches vertically during the longitudinal reciprocation of the punch, said means effecting the vertical movement of said frame automatically and solely by the longitudinal movement of the punch unit.

The present invention further provides means to cause the punching means to be depressed automatically and at the same position of the punching unit irrespective of the columns to be punched whereby the previous extent of movement of the card over the punches may be utilized as a control to select the columns to be punched.

Another object of the invention is the provision of means to unset the latched punches after the punching operation and which means is also effected solely by the longitudinal movement of the punch unit.

A still further object of the invention is to provide a novel setting-up relationship between a reciprocable punch unit and its setting mechanism in order that the punch unit will remain stationary for a short period prior to its excursion to punching position and retain said setting mechanism stationary to restore the setting-up relationship between the setting mechanism and the punch unit when the latter is restored or returned to normal.

A still further object of the invention is to provide conventional means to latch the interposers and punches and to provide means operating independently of conventional return springs for the interposers and punches for positively restoring said unlatched interposers and punches. The positive restoring mechanism for the interposers has the important function of maintaining the interposers elevated during the reciprocation of the punch unit to prevent depressed interposers from interfering with the unset punches which would be in the path thereof during the longitudinal reciprocation of the punch unit.

According to the present invention the utility of the present machine is augmented by providing selecting means for selecting the desired group of columns to be punched.

In some types of machines constructed according to the present invention the punching mechanism may have a number of rows of punches corresponding in number to the 80 columns of a conventional record card, and in others only a group of columns need be punched. In this instance novel selecting means requiring simple manipulation selects the desired group of columns to be punched.

In connection with the selection of a group of columns to be punched it is an object to devise a punching mechanism to which cards are continuously fed with adjustable means capable of changing the time of operations of correlated functions, such as punch depression, punch unit reciprocation, unlatching of selected punches, etc., with respect to the extent of card feed whereby the extent that a card is over the punches selects the desired group of columns.

In other words, a broad object of the invention is to vary the time of operative relationship between a selected area of the card and the punching operation, whereby selected areas of the record or card may be punched.

More specifically it is a broad object of the invention to adjust and vary the time of card punching to select the desired group of columns of a moving card to be punched.

A more specific object of the invention is to delay the functional operation of the punching unit to cause a record fed at a constant rate to have a selected area comprising a plurality of columns operatively correlated with the punches before the operation of the punches to punch said selected areas.

It is an object of the invention to devise a single cam driven by the card feed shaft to perform the functional operations of the punch and to provide adjustable means to change the timing relationship between said cam and feed roll shaft to select and vary the time of functional operations in accordance with the area of the card to be punched.

In accordance with this invention the single cam which effects said functional operations may be angularly and manually adjusted with respect to a driving disk driven by said card feed shaft and by the provision of a pin passing through said disk into a hole of the cam, preferably selected by manual rotation of the cam, the desired angular relationship to select the area to be punched is obtained.

It is a further object of the invention to provide a chart of indicia visible to the operator by turning the cam to direct the pin connection which should be made to select the column or group of columns to be punched.

A still further object is to devise a selecting means of the pin connection type which by the provision of interpolating holes reduces the number of holes to less than the number of columns which can be selected.

A still further object of the invention is to provide micrometer adjustable means which adjusts in a precision manner said cam relative to the driving shaft for the card feed unit to insure punching at exact positions columnwise, since said adjustment determines and controls the position of the punch unit relative to the card column columnwise.

Any suitable source means may be provided for setting up the punching and in this respect it is an object of the invention to provide a suitable punch setting means which may be set up during the longitudinal reciprocation of the punch unit and which punch setting means transfers the setting to the interposers when the interposer unit is moved against the punch setting means to receive the reading which is subsequently transferred to the punches. Due to such overlap operations much time is afforded to set up said setting means preliminary to transfer to the punches and by overlapping the setting up, transferring, and punch setting, considerable machine time is saved.

While punching of records and cards have been referred to, the particular type or form of record which is punched is immaterial since the present invention may be incorporated in a variety of punching machines; such as tape punches, metal punches, etc. While it is desirable to incorporate in a single punching machine all of the novel constructions, nevertheless some of the expedients may find application singly or in desired combinations in other forms of punching machines. The specific form of punch and the capacity of the punch can be varied according to the requirements, nevertheless utilizing the novel principles of the invention.

Further and incidental improvements but relatively important comprise locking means for the punch unit which locks said punch unit in setup position, cam means to positively restore the punch unit; improved operating means for shuttling or reciprocating the punch unit, and a novel structure which provides for the assembly of the die block and the punches as a unit, whereby the punches are properly correlated with holes in the die block in all positions of the punches; the provision of a punch lever and stripper lever cooperating with support for the punches which punch lever in the longitudinal movement of the punch unit automatically depresses the punches to effect punching, and which stripper lever positively restores the punches to extract or withdraw the punches from the punched card, both levers operating functionally while the punch unit and card are moving together in synchronous motion, and means to prevent said punches from receiving a second unwanted depression during the return stroke of the punch unit as the punched card proceeds to a storage receptacle.

Other objects of the invention will be pointed out in the following description and claims and illustrated in the accompanying drawings, which disclose, by way of example, the principle of the invention and the best mode, which has been contemplated, of applying that principle.

Figure 1:
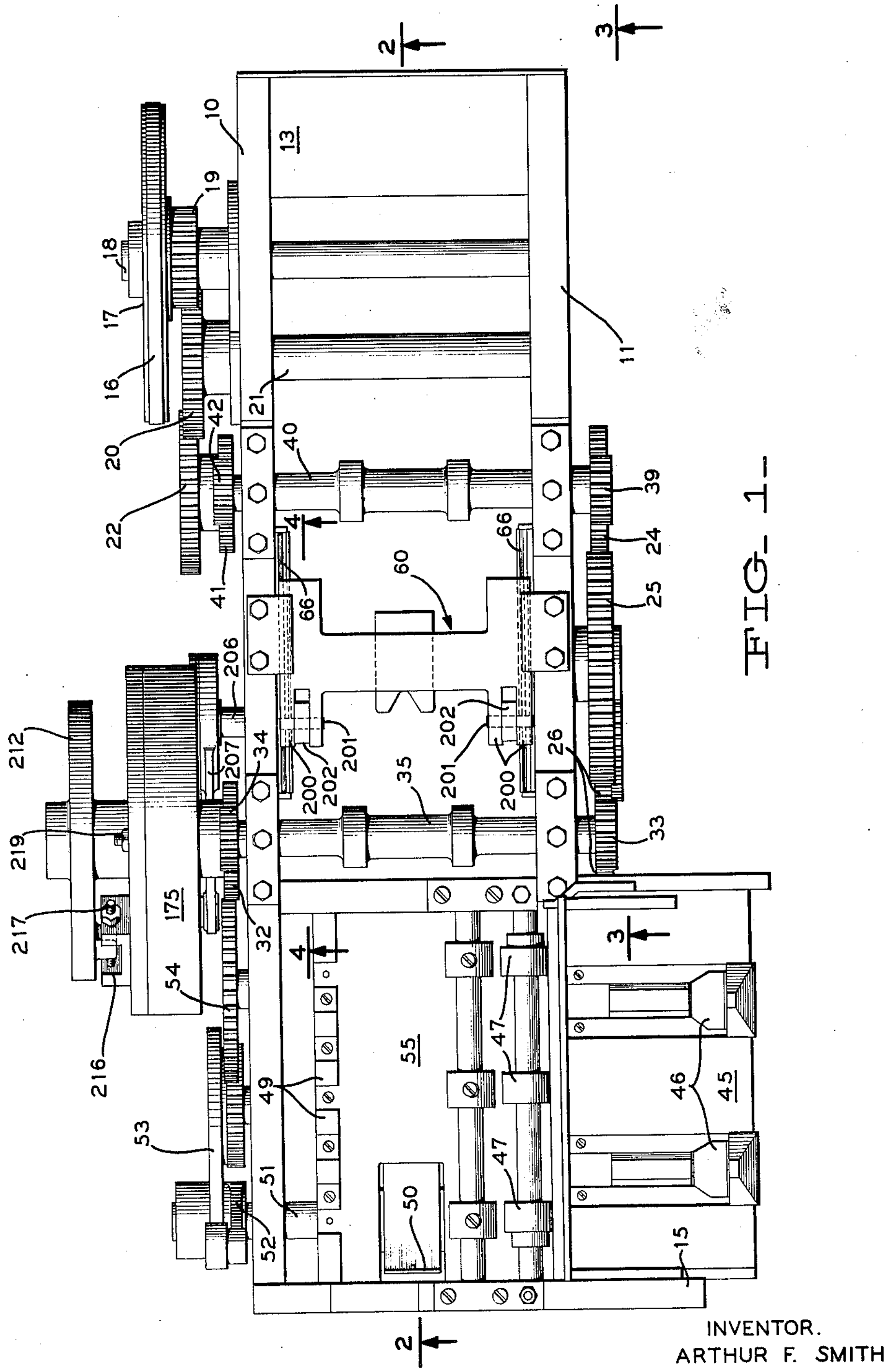
FIG. 1 is a plan view of a punching machine in which the present invention is preferably incorporated.
Figure 2:
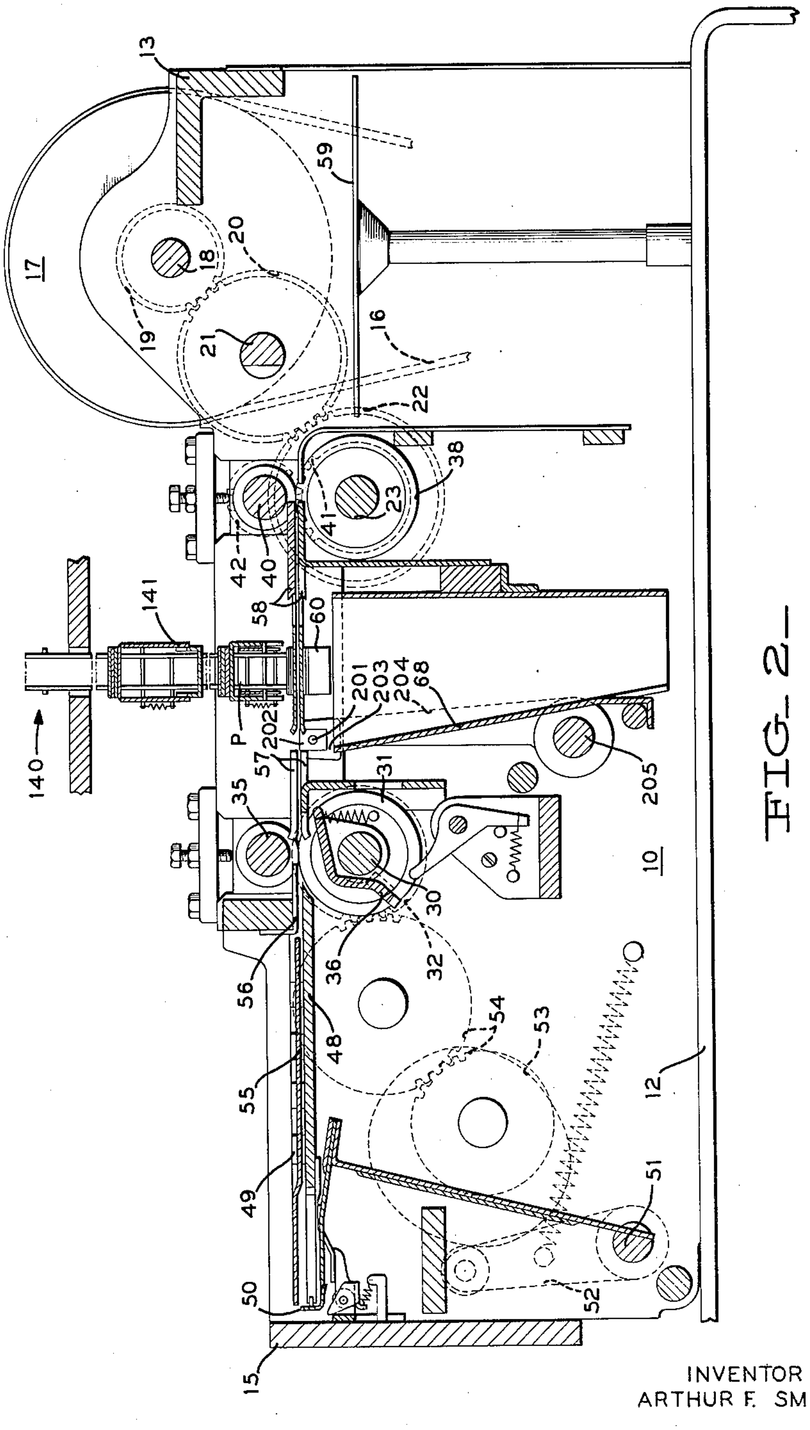
FIG. 2 is a longitudinal sectional view taken on the line 2—2 of FIG. 1.

To support and journal the shafts and principal elements of the card feeding and punching apparatus there are provided rear and front frame plates 10 and 11 (see FIG. 1), fixed to a base plate 12, shown in FIG. 2.

Figure 3:
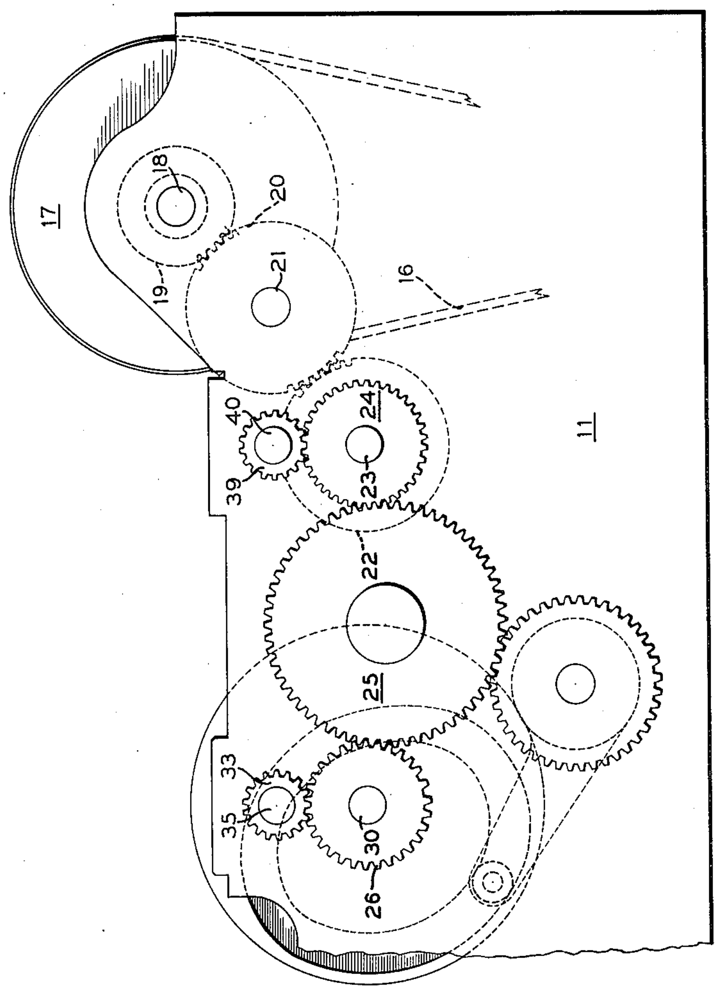
FIG. 3 is a front elevation view taken on the line 3—3 of FIG. 1 showing particularly the main gear train drive.
Figure 4:
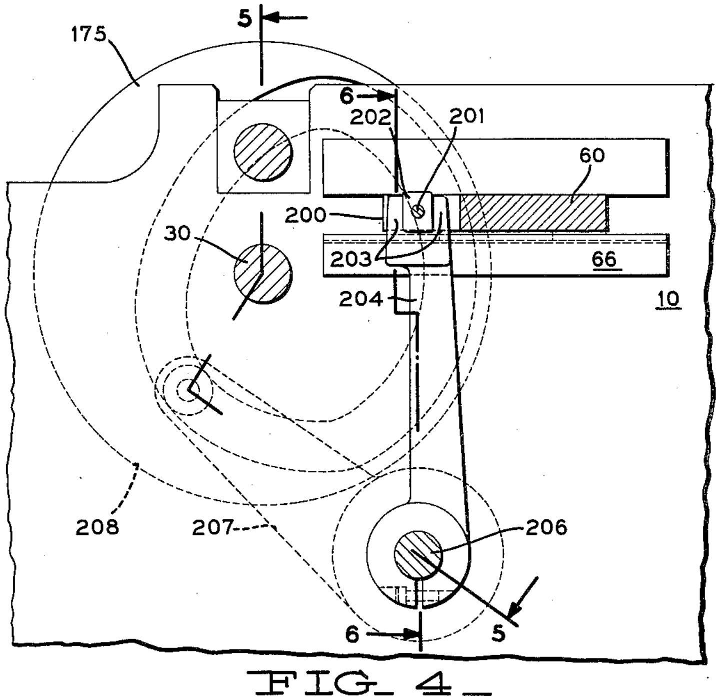
FIG. 4 is a view in side elevation, partly in section and is taken on the line 4—4 of FIG. 1 but on an enlarged scale.

Strengthening of the machine frame is principally effected by a cross member 13 and an end plate 15. Other elements such as transverse shafts and other members not specifically described herein are also provided for the purpose of strengthening and stiffening the frame. A prime mover, such as an electrical motor not shown, drives through a belt 16 (FIG. 1) a pulley 17 which is secured to a shaft 18 journaled in the rear and front frame plates 10 and 11. Attached to said shaft 18 is a gear 19 (FIG. 3) and from this gear 19 there is a gear train drive to the constantly rotating main drive of the punching mechanism to be subsequently described.

Gear 19 meshes with an idler gear 20 (see FIGS. 1 and 3) secured to a shaft 21 carried by the frame plates 10 and 11. Gear 20, which is mounted outside of frame plate 10, meshes with a gear 22 carried by a lower feed roll shaft 23. Outside of the frame plate 11 the lower feed roll shaft 23 carries a gear 24 which, through an idler gear 25 pivoted on a stud shaft carried by the frame plate 11, meshes with a gear 26 (see FIG. 1) carried by the lower feed roller shaft 30 which constitutes the main drive shaft for the punching mechanism.

As best shown in FIGS. 1 and 2, there is provided a first set of feed rollers, the lower feed roller 31 of which is rotated by the shaft 30. The gear 26 and a gear 32 secured to the lower feed roller shaft 30 mesh with respective pinions 33 and 34 carried by the upper feed roll shaft 35. Feed roller 31 also carries a card gate 36 (FIG. 2) which serves to align the leading edge of the card to be punched. This aligning mechanism forms no part of the present invention and is shown and claimed in the application of Arthur F. Smith, Serial No. 750,405, filed July 23, 1958.

The following or second set of feeding rollers may serve to eject the punched card to a storage hopper. The lower feed roller 38 is secured to the shaft 23 and the gear 24 (FIG. 3) carried by the shaft 23 meshes with a pinion 39 (FIG. 3) secured to the upper feed roller shaft 40. A gear 41 (FIG. 1) which is outside of the rear frame plate 10 is also carried by the shaft 23 and meshes with a pinion 42 carried by the feed roller shaft outside of the rear frame plate 10.

CARD FEEDING MEANS

The card feeding means employed in the present machine is fully shown and described in the application of Arthur F. Smith, Serial No. 750,405, filed July 23, 1958, to which reference may be had for details of construction. However, the feeding mechanism shown in this application will be described herein in sufficient detail to understand the manner of feeding cards to the punching mechanism.

The machine is designed to punch conventional record cards which, it is well known, are punched in 80 vertical columns, each column containing 12 rows or index point positions at which positions rectangular holes are punched by the punching mechanism herein for utilization of the punched cards in other statistical machines.

A supply of these cards to be punched is placed in the card supply hopper 45 (FIG. 1) with the top or 12 index point leading. Cards are fed out of this hopper by a pair of card pickers 46 which feed cards singly to ejecting rollers 47. Said rollers are above a table 48 (FIG. 2) and feed each card with the 12 index point leading over said table and the leading horizontal edge against an aligning bar 49, thereby aligning or straightening out the card. Thereafter, a card pusher 50 (FIGS. 1 and 2) pushes the card to the right with column 80 of the card leading. The card pusher 50 is shown in detail in FIG. 2 and is secured to a rock shaft 51 to which a follower arm 52 is secured bearing against a cam 53. Said cam is rotated by a gear train 54 mounted outside of the frame plate 10 and driven by the gear 32 secured to the main drive shaft 30.

The pusher feeds the card to the feed rollers rotated by the upper feed roll shaft 35 and the feed rollers rotated by the lower feed roll shaft 30. In the meantime, said card gate 36 comes to a position where it functions as a stop or abutment for the leading edge of the card. Further feeding of the card by the pusher 50 effects a slight buckling action of the card to project the leading edge against said gate to straighten or align its leading edge.

The card pusher 50 pushes the card between the table 48 and a cover plate 55 (FIG. 2) and said card is further guided by a guide plate 56 (FIG. 2) as it is received by the bite of the first set of feed rollers. After card alignment, the first set of feed rollers further feeds the card guided by guide plates 57 to the punching mechanism P. As the card is fed further it is guided by guide plates 58 to be received by the second set of feeding rollers carried by shafts 40 and 23 respectively. The punched card is ejected in a storage hopper 59 (FIG. 2).

As a recapitulation, it will be understood that after the card has been aligned along its top leading edge, said card is fed to the right with column 80 of the card leading. Thereafter, the card gate 36 aligns the card along its leading vertical edge and by such aligning means it is insured that the cards are punched in the vertical columns at exact index points positions, which is a requirement for the punched cards to subsequently control statistical machines. As the card is fed and guided by the card guide plates 57 and 58, the punching mechanism described in the following sections is actuated to punch, in a selected column or group of columns, the desired information set up in the punch selector mechanism prior to the punching operation.

The present machine preferably includes a group of columns selection device which is settable by the operator to select the desired card column or a group of 8 or less columns. However, before such selection device is described in detail, a description of the punching mechanism will be given.

PUNCHING MECHANISM

(*1*) *Die Plate Group*

Figure 7:
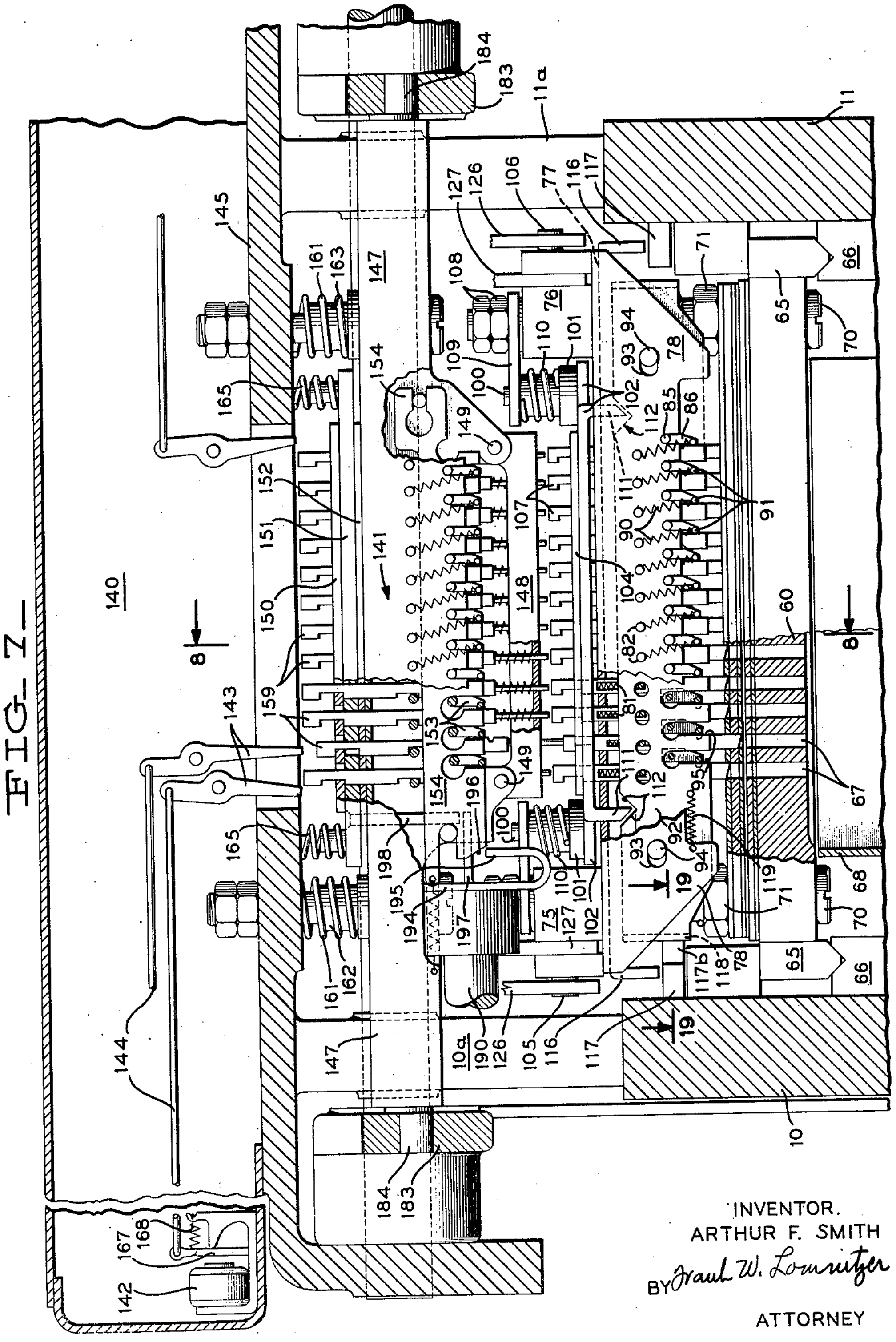
FIG. 7 is a transverse sectional view of the card punch showing the relation between the card punching mechanism, the intermediate interposer punch selecting mechanism, and uppermost selector mechanism for the interposers.
Figure 8:
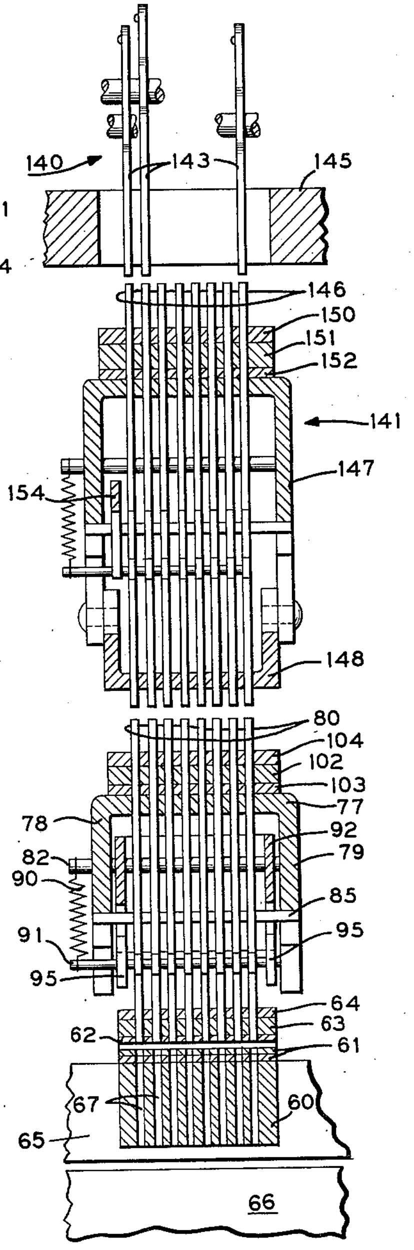
FIG. 8 is a transverse sectional view taken on the line 8—8 of FIG. 7.
Figure 11:
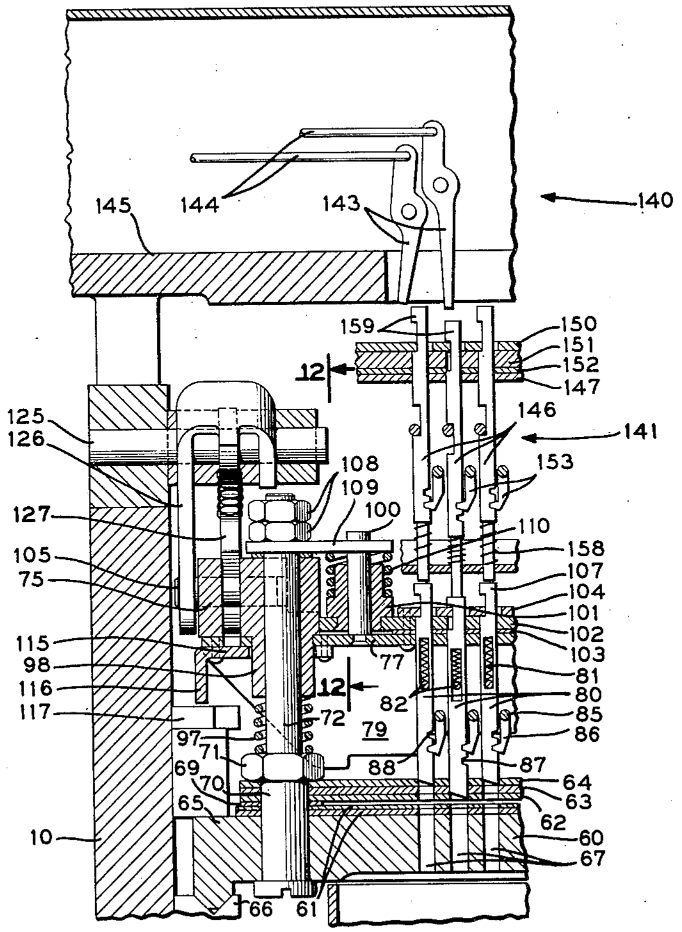
FIG. 11 is a sectional view on an enlarged scale showing one end of the card punch to show details of the card punches and interposers.

The die assembly which is best shown in FIGS. 7, 8 and 11 is mounted to resist downward movement to enable the selected punches to pass through the die holes. The die assembly includes a die block 60 (see FIG. 8), a pair of die or punch plates 61, a stripper plate 62, a spacing plate 63, and a top cover plate 64. The die block is a heavy casting wide enough to carry eight or more, if desired, columns of the punching mechanism and extends as shown in FIG. 7 between the front frame plate 11 and rear frame plate 10. The die block 60 carries at each side shoes or side rails 65 diagonal in shape to fit in complementary shaped grooves of runners or tracks 66 secured to the inside of the rear and front frame plates 10, 11. The tracks support not only the die block but the entire punching mechanism exclusive of the interposer mechanism and guide the punching mechanism as it is moved longitudinally to the right and back to the left for a reason to be explained hereinafter.

The die block is formed with holes and to conform with the twelve index point positions of the record card said block is provided with a total of ninety-six holes 67 comprising 12 holes (FIGS. 7 and 8) for each of the eight card columns to be punched by the present machine. The holes 67 are rectangular in shape but a little larger rectangularly than the holes formed in the die plates 61, in order that chips formed by the card punches drop loosely downward through the holes and into a chip receiver or receptacle 68 (FIG. 2). The two die or punch plates 61 through which the punches pass are perforated to correspond in size with the punches which punch the card.

(*2*) *Guide Plates and Die Block Assembly*

Interposed between the upper die or punch plate 61 and stripper plate 62 is a pair of spacer plates 69 (see FIG. 11) which guide the upper and lower longitudinal edges of the card. Above said guide plates 69 is assembled the stripper plate 62, spacing plate 63 and top assembly plate 64, all of which are perforated with columns of holes like the die or punch plates 61, since the punches are adapted to pass through these holes. The above elements constitute the die assembly and all are clamped together by a pair of bolts 70 and nuts 71 (see FIG. 11). The bolts 70 extend upwardly to provide guide posts 72 which serve to guide the vertical reciprocation of the punch group as it is so operated during the punching operation.

*(3) Punch Group*

The punch group is best shown in FIGS. 7, 8 and 11 and is slidably mounted as a unit on the posts 72 to enable a vertical reciprocation of the selected punches and to effect punching during the downward movement of the punches. The punch group also carries a punch restoring plate 104 which is operable independently during the upward movement of the unit to positively restore the latched punches. While individual springs are utilized to restore the punches, said restoring plate insures the restoration of the latched punches. The vertical reciprocation of the punches and the independent reciprocation of the punch restoring plate are effected in a predetermined timed sequence; punch restoring obviously following the punch operation and punch unlatching operation. The means for effecting this sequence of operation will be described later in detail.

Slidably mounted on the pair of guide posts 72 is a frame comprising two castings 75 and 76 (FIG. 7). Each has secured at its under-side an inverted U-shaped bail having a top plate 77 (FIG. 7) and side plates 78, 79 (see FIG. 8). The top plate 77 is perforated to receive and guide the punches 80 when they are selectively depressed to be latched downwardly. There are, of course, eight columns of punches and each column comprises twelve punches 80. A set of eight punches is adapted to punch the same index point position or row of a card. Each punch is slotted as shown in FIG. 11 to receive a return spring 81, one end of which bears against the upper end of the slot in the punch and the other end against a rod 82 which is supported by the side plates 78 and 79 of the U-shaped bail (see FIG. 8). There is a rod 82 for each group of eight punches which punch the same index point position on the card.

To latch the selected punches there is pivoted on journal rods 85 which are also supported by the side plates 78 and 79 a curved latch plate 86 (FIGS. 7 and 11), there being one latch plate provided for each group of eight punches which punch the same index point position in a card. Each curved latch plate normally fits in the lower notch 87 of the respective punch 80 when it is in an upward position ready to be selected for punching but when said punch is depressed it will be latched in the upper notch 88 and since the latch plates are resiliently urged towards said notches it will latch the punch in depressed position. Each pivoted latch plate 86 is resiliently urged to latching position by menas of a spring 90 (FIGS. 7 and 8) extending between an extension of the rod 82 which is outside of the side plate 77 and a rod 91 carried by the respective latch plate 86.

The means for unlatching the punches selected for operation comprises a U-shaped bail 92 between the two side plates 78 and 79 and guided for sliding movement in the bail 77, 78, 79 by means of guide slots 93 (FIG. 7) in side plates 77, 78 in which fit studs 94 carried by the side plates of bail 92. The side plates of the U-shaped unlatching bail 92 are provided with slots 95 engaging rods 91 to thereby cause, in the right-hand movement of the unlatching bail 92, rocking of the latch plates 86 counterclockwise as viewed in FIG. 7, disengaging each from the upper notch 88 when any punch in a group of eight may have been latched downward, which punch is then returned upwardly to normal by its respective spring 81. By means to be described later, the punch unit is depressed to cause the latched punches to pass through the card and into the die or punch plates 61, as best shown in FIG. 11 for the middle punch 80.

Encircling each post 72 is a coil spring 97 (FIG. 11) extended between the clamping nut 71 and a hub 98 of the related casting 75 or 76. The punch group is depressed against the depression of spring 97 which thereafter functions to restore or return the punch group to normal position after the punching operation.

*(4) Punch Restoring Plate Group*

Extending upwardly and secured to the top plate 77 of the U-shaped bail 77, 78, 79 are guide posts 100 (FIGS. 7 and 11) on which is slidably mounted a pair of hubs 101 staked to which is a plate 102. Underneath the plate 102 there is a guide plate 103 and over plate 102 there is a punch restoring plate 104. These three plates are perforated similar to the other plates to receive the tops of the punches 80. As best shown in FIG. 11 each punch has a head portion 107 which is adapted to rest upon the punch restoring plate 104 when a punch is depressed, as shown for the middle punch of the group of three shown in FIG. 11. By conventional means such as rivets the three plates 102, 103 and 104 are preferably attached to each other for unitary movement as a punch restoring plate group.

Clamped against the top of each casting 75 and 76 by clamping nuts 108 is a plate 109 having a hole receiving the related guide post 100. Interposed between each plate 109 and an annular shoulder of each hub 101 is a spring 110. Said springs 110 insure the simultaneous downward movement of the punch restoring plate group with the punch group but enables an upward movement independent of the punch restoring plate group. Said castings 75 and 76 carry a pair of lateral extending studs 105 and 106 which are raised and lowered by means to be described to vertically reciprocate the punch group and punch restoring plate group which together comprises the punch unit.

To effect independent movement of the punch restoring plate group to restore the punches, the plate 102 has a pair of down-turned projections 111 (see FIG. 7) passing through holes in the top plate 77 of the U-shaped bail 77, 78, 79 to engage the respective cam edges 112 of the pair of side plates of the U-shaped bail 92. When said bail 92 is moved to the right as viewed in FIG. 7 to unlatch the punches the diagonal cam edges 112 will elevate the punch restoring plate group against the action of springs 110. Since the heads 107 of the latched punches 80 rest upon the integral portions of the punch restoring plate 104 movement of said plate upwardly will positively raise the punches a slight amount to normal, thereby assisting the return springs 81 in this operation. Thereafter, the compressed springs 110 will, as the bail 92 is moved to the left, force the punch restoring plate group downwardly upon the plate 77.

*(5) Safety Lock for Punch Unit*

Riveted to the plate 77 of bail 77, 78, 79 is a bracket plate 115 (FIG. 11) having a downturned integral portion 116. As best shown in FIG. 7 a pair of such right angled plates 115 is provided and they cooperate with a safety cam plate or block 117 (FIG. 20) to make certain that the punch unit is in "up" position during punch setting time.

Figure 20:
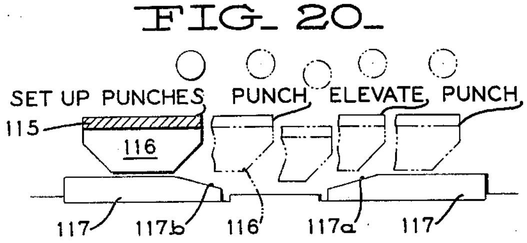
FIG. 20 is a diagrammatic view showing the stationary cam means to normally lock the punch unit and to positively restore the punch unit after a punching stroke.

In the left-hand position of plate 115 each portion normally rests upon the top edge of the respective stationary block 117, this being, as shown in FIG. 20, the position of the punch unit when the punches are set up by being selectively latched down. The resting of the portion 116 on the related block 117 will lock the punch unit in "up" position. As the punch unit travels horizontally to "PUNCH" position, portion 116 cooperates with a recess in block 117 and said punch unit can now be freely depressed. During the further right-hand longitudinal travel of the punch unit and after the punching operation the punch is elevated by means to be described to lift the punches out of the card and die plates 62 and 63, being assisted by the springs 97. During punch elevation time each portion 116 may engage a respective cam edge 117a of block 117 positively elevating the punch unit, insuring complete lifting of the punch unit to normal position. If the punch unit should still be depressed slightly in the return of the punch unit to "SET UP" position cam edge 117*b* will positively elevate the punch unit.

*(6) PUNCH Unlatching and Restoring Operation*

Figure 19:
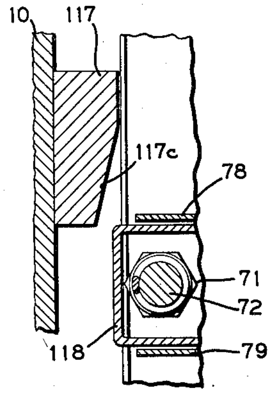
FIG. 19 is a sectional view of a detail of the machine relating to the punch unlatching and restoring operations and is taken on the line 19—19 of FIG. 7 but on an enlarged scale.

It is pointed out that the pair of cam blocks 117 is carried by the rear frame plate 10 and front frame plate 11. The cam block 117 secured to the rear frame plate 10, has as shown in FIG. 19, a supplemental cam edge 117*b*. Said cam edge cooperates with the cross plate 118 (see also FIG. 7) of the U-shaped bail 92 which, it will be recalled, is the means for unlatching the depressed punches and elevating the punch restoring plate group to positively restore the depressed punches.

Immediately following the card punching operation and elevation of the punch effected by means just described and other means to be presently described the supplemental cam edge 117*c* (see FIG. 19) will engage the cross plate 118 and move the U-shaped bail 92 to the right, as viewed in FIG. 7.

As has been described, this movement of bail 92 rocks the group of punch latching plates 86 to disengage them from the notches 88 of the depressed punches 80, and as has been described effects the elevation of the group of punch restoring plate group.

During the return of the punch unit to its left-hand or setup position cross plate 118 rides off the cam edge 117*c* (FIG. 19) and the U-shaped bail 92 is restored to normal by a spring 119 (see FIG. 7). During this return stroke latch plates 86 engage the lower notches 87 of punches 80 preparatory to a new setup of selected punches which may be effected in a preferred manner to be described.

AUTOMATIC PUNCHING OPERATIONS

Reference has been made to the depression and elevation of studs 105—106 (FIG. 7) to depress the punch unit to effect punching and to lift the punch unit to strip the punches from the card. Herein this is effected automatically in the same position of the punch unit solely by its longitudinal reciprocation but at a selected time by the preferred means shown in FIGS. 12 to 16 inclusive. FIGS. 13 to 16 represent a sequential action of a punch lever and a stripper lever through an entire forward (i.e. to the right) punching cycle of the reciprocating punch unit.

Figure 12:
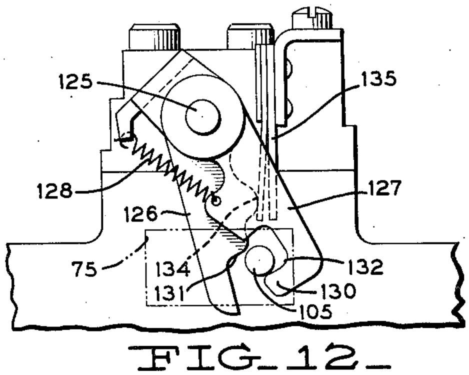
FIG. 12 is a view in side elevation taken on the line 12—12 of FIG. 11.

Two sets of punch levers 126 and stripper levers 127 are provided to cooperate with the respective studs 105 or 106 but in view of their similarity in construction and operation the description will be confined to the punch lever and stripper lever carried by the rear frame plate 10 and cooperating with the stud 105 (see FIGS. 11 and 12).

Referring to FIGS. 11 and 12 the rear frame plate 10 carries a pivot rod 125 on which is loosely pivoted a pair of levers; lever 127 comprising the stripper lever, i.e. it strips or lifts the punches out of the card. Lever 127 is U-shaped at its top to give a better bearing on the pivot rod 125, and extends downwardly in the plane of the stud 105. The other or punch lever 126 is also pivoted on rod 125 and is called a punch lever since it effects the depression of the punches. Said lever 126 passes through a slot formed in the casting 75 intersected by the stud 105 so as to also cooperate with the stud 105. A tensioned spring 128 is extended between levers 126 and 127 which closes them together, permitting however an independent movement of either when required.

POSITION NO. 1—PUNCH SETUP POSITION

Figure 13:
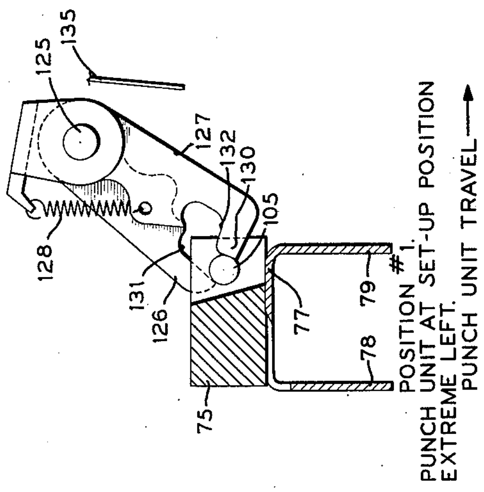

FIG. 13 shows the normal position of the parts when the punch unit is at punch setup position (elevated and at the extreme left) wherein it will be seen that the spring 128 causes the lower ends of the levers 126 and 127 to close upon the stud 105. In this position the punch unit remains stationary for a short interval in order that the selected punches 80 may be depressed and latched. Thereafter, there is a movement of the punch unit relative to the interposer unit which will be subsequently described and is in a right-hand direction or the direction that the card to be punched travels.

POSITION NO. 2—INTERMEDIATE POSITION

Figure 14:
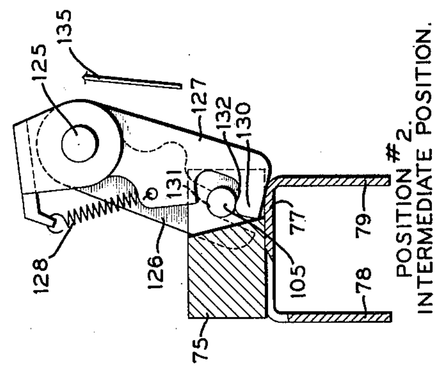

The first movement of the punch unit brings it to a position shown in FIG. 14. This is a position midway the normal punch setup and the punching position shown in FIG. 15. As the stud 105 moves rectilinearly both levers 126 and 127 are rocked about their pivot 125 by the stud 105. The hook portion 130 of stripper lever 127 moves underneath the stud 105 and the tension in spring 128 rocks the punch lever 126 so that a shoulder 131 thereof is immediately over the stud 105. This is the position that the parts occupy when punch lever 126 commences to depress the punching unit to the punching position shown in FIG. 15.

POSITION NO. 3—PUNCHING UNIT DEPRESSED TO PUNCH

Figure 15:
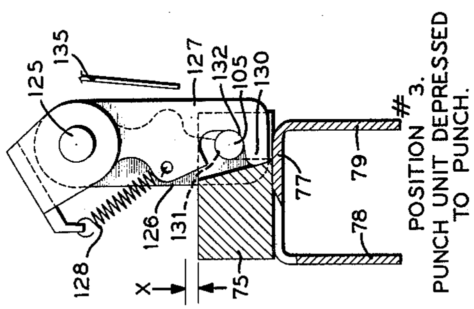
FIGS. 13–17 are views similar to FIG. 12 but show the successive position of the punch depressing and punch restoring mechanism during the forward stroke of the card punch unit.

The actual punching operation occurs between the two sets of feed rollers shown in FIGS. 1 and 2 when the speed of the travel of the punch unit to the right coincides with the card speed. The extent of depression of the punch unit from the FIG. 14 position to FIG. 15 position shown by the dimension "X" is sufficient to cause the punches to be forced through the card. As the punch unit moves further to the right to FIG. 15 position the rocking of punch lever 126 counterclockwise effected by the further rectilinear travel of the stud 105 will cause the shoulder 131 to act as a cam to depress stud 105 and therefore the punching unit. The stud 105, as shown in FIG. 15, enters, during this operation, the recess 132 of the stripper lever 127 which is suitably dimensioned to receive the stud 105 and not interfere with the depression of the punch unit.

POSITION NO. 4—ELEVATION OF PUNCH UNIT

Figure 16:
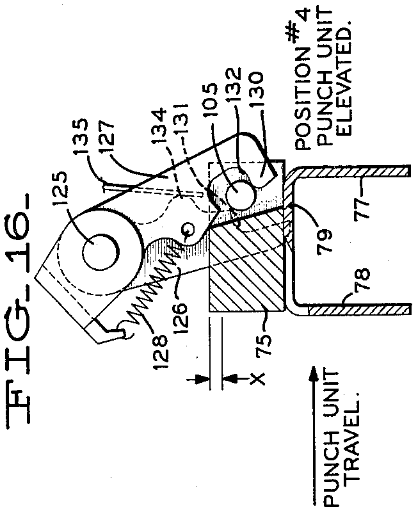

After the punching operation the punch unit travels further to the right to the position shown in FIG. 16 and FIG. 12.

With stud 105 firmly seized between shoulder 131 of the punch lever 126 and recess 132 of the hook 130, swinging of both levers 127 and 126 counterclockwise to the FIG. 16 position will positively raise stud 105 upwardly. The hook 130 functions as the punch stripper. As stud 105 moves away from shoulder 131 the punch unit is unlocked which thereupon rises to upward normal position, primarily by the action of springs 97 (FIG. 11) but also by the action of cam edge 117*a* (FIG. 20). After the punch unit has been elevated by the stripper lever 127, a projection 134 of the punch lever 126 will engage a flat stationary spring 135 (see also FIG. 12). Spring 135 which is stronger than spring 128 now stops the further counterclockwise rocking of punch lever 126.

POSITION NO. 5—EXTREME RIGHT-HAND POSITION

Figure 17:
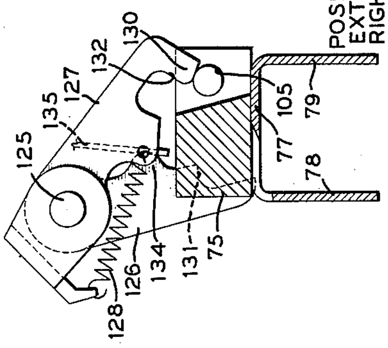

FIG. 17 represents the extreme right-hand position of the punch unit. The movement of stud 105 from the FIG. 16 position causes it to act as a cam on the edge of the hook portion 130 of the stripper lever 127 so as to eventually rock the lever 127 further counterclockwise to the position shown in FIG. 17. It will be noted that the punch lever 126 having been stopped in the FIG. 16 position is also shown in a similar position in FIG. 17. Following the extreme right-hand position of the punch unit the card travels further to the right to the storage hopper 59 but the punch unit is then returned to the left by a reverse stroke.

*(5) Return Travel of Punch Unit*

Figure 18:
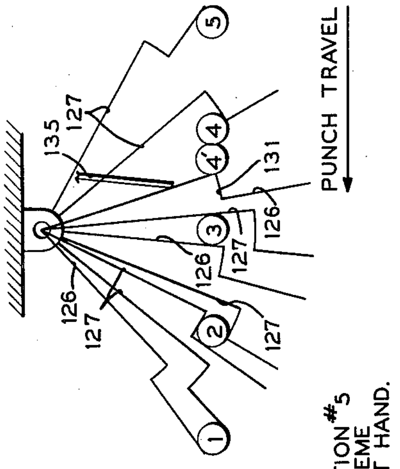
FIG. 18 is a diagrammatic view showing the successive positions of the mechanism of FIGS. 13–17 taken during the return stroke of the punch unit in order to show more clearly how the punch depressing mechanism is rendered ineffective during the return stroke of the punch unit to thereby prevent an unwanted second punching stroke.

When the punch unit has been moved to the extreme right-hand position shown in FIG. 17 it is then returned to the left through successive positions and finally back to the FIG. 13 position. FIG. 18 shows diagrammatically the successive positions of the punch lever 126, the stripper lever 127 and the punch unit when they and the stud 105 are moved sequentially through positions 5, 4, 4′, 3, 2 and 1, in the order named. As stripper lever 127 moves through positions 5 and 4 and 4′, the punch lever 126 is held against the spring 133. It should be noted that the punch unit is now in elevated position and stud 105 moves in the same rectilinear straight path through positions 5 to 1 in the order named. In the movement of stud 105 from positions 4′ to position 3 the stud 105 strikes the punch lever 126 and as the stud 105 moves to position 3 punch lever 126 rocks clockwise but the stud 105 is positioned above the cam edge 131 of punch lever 126. Hence, it is evident that the contact of punch lever 126 with the flat spring 135 near the end of the right-hand travel of the punch unit prevents lever 126 from engaging the stud 105 on the return stroke, thereby preventing downward motion of the punch unit during the return stroke.

As the punch unit then moves through positions 2 and 1 it is evident that neither lever 126 nor 127 has any effect on the stud 105 and the latter continues to move in its normal rectilinear path without effecting any movement of the punch unit. The diagrammatic position shown as 1 in FIG. 18 corresponds with the position shown in FIG. 13. The parts now being in the FIG. 13 position a repetitive card punching operation can now be effected for the following card.

DATA SETUP UNIT AND INTERPOSER UNIT

The punch setup is effected under control of two units; the selective data setup unit 140 (FIGS. 7, 8 and 11) and the interposer unit 141 which is elevated to receive the data setup from unit 140 and then depressed to transfer it to the punch unit. Associated with the interposer unit is an operating means for effecting its reciprocation and means to also unlatch the interposers which have been latched to represent the data setup.

Figure 24:
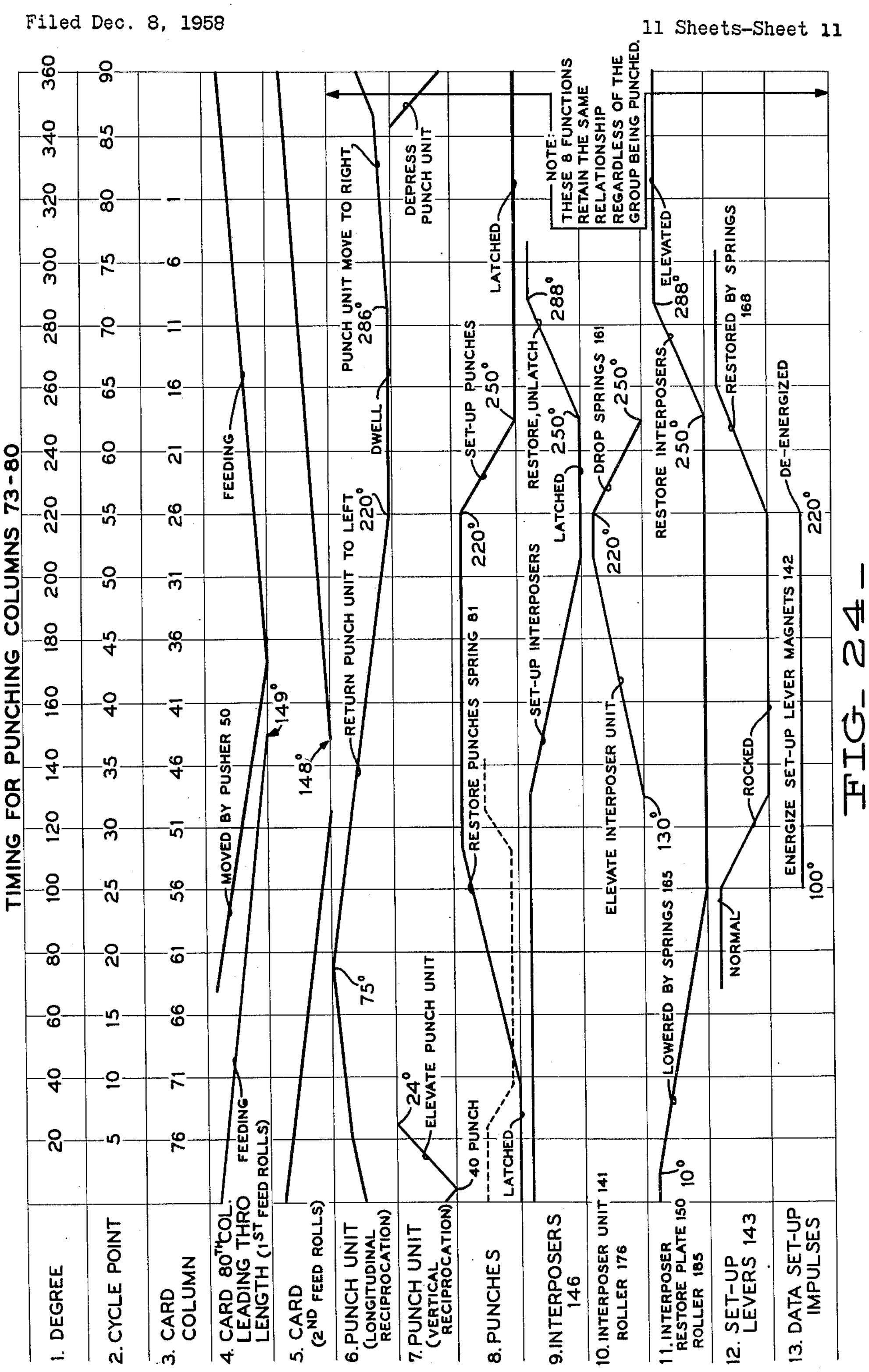
FIG. 24 is a timing diagram of the machine showing the timing for punching selected columns 73–80 of an 80-column record card.

The punch setup procedure will be clarified by reference to the timing chart of FIG. 24 which shows the timing for punching columns 73—80 of the card. At 100° of the machine cycle, data setup pulses (timing No. 13) are transferred to magnets 142 (FIG. 7), pulling call links 144 and rocking the data setup levers 143 at about 130°. The maintained energization of said magnets retains the selected levers 143 in rocked position to 220° in the machine cycle.

At 130° an operating mechanism to be described later is effective to lift the interposer unit when the levers 143 are still in rocked position (see timing No. 10) so that by engagement of the interposers with said levers the interposers are set up, and they remain latched up to 250°. (See timing No. 9.) At 220° the interposer unit drops down quickly (timing No. 10) by means of springs, to be described, and the engagement of the latched interposers with the punches 80 will set up the punches between 220° to 250°. (See timing No. 8.) At 250° of the machine cycle a restoring mechanism (see timing No. 11) operates to restore the unlatched interposers between 220° to 288°, ready for another setup of the interposers. However, the punches 80 remain latched and set up for the rest of the cycle and up to 40° of the next cycle when they are restored for a new setup by mechanism previously described.

With this general understanding of the procedure, a description will now be given of the detailed construction of the units.

The interposer unit 141 is stationary and, in its elevated position, is over the punch unit when the punch unit is at its extreme left-hand (or punch setup position). The interposer unit is supported by extensions 10*a* and 11*a* (FIG. 7) of the respective rear and front frame plates 10 and 11. Mounted on top and bolted to the extensions 10*a* and 11*a* is a cover plate 145 which supports the interposer unit.

In view of the similarity in construction between the punch unit and the interposer unit, the details of construction of the interposer unit 141 will be given only generally, reference being directed to the previous description of the construction of the punch unit for further information.

The interposers 146 are arranged like the punches in eight columns of 12 each in order to select a corresponding number of punches. The interposers 146 are slidably mounted in two U-shaped frames 147 and 148 (see FIGS. 7 and 8), the bottom frame 148 being inverted and secured to the upper U-shaped frame 147 by rivets 149. The upper ends of the interposers are also slidable in a restoring plate group 150, 151 and 152 which are similar in all respects to the restoring plate group 104, 102 and 103 for the punches. The depressed interposers are latched like the punches by their latch plates 153 (FIG. 11) and an unlatching plate 154 slidably mounted in the upper U-shaped frame 147 rocks the latch plates 153 to unlatch the interposers 146 which have been depressed. The latched interposers are then restored by their springs 158. The interposer restoring plate 150 is elevated to engage the heads 159 of the unlatched interposers 146 to assist said springs 158 in the restoration of the unlatched interposers.

Interposed between the U-shaped frame plate 147 and the underside of the cover plate 145 are the interposer unit restoring springs 161 (see FIG. 7). The elevation of the interposer unit against the levers 143 to latch selected interposers is effected by the elevation of studs 162 and 163 carried by the upper U-shaped frame 147 and by depressing said studs the data setup on the latched interposers is transferred to the punches. The means for elevating and then lowering the interposer unit to its normal position will be subsequently described. After the transfer of the data setting of the latched interposers to the punches 80 which are then latched downward, as has been described, the restoring plate group 150, 151 and 152 is elevated against the action of springs 165 (similar to spring 110) to restore the unlatched interposers.

The data to be punched is dependent upon the particular interposer latched in each column, and any suitable means may be provided to cause selective data to be punched on the card. As herein shown, each of a group of twelve magnets 142 when energized attracts its armature 167 and pulls the call wire 144 to rock the respective lever 143 against the action of the armature spring 168. (See timing No. 12, FIG. 24.) The right-hand lever 143 shown in FIG. 7 has been shown rocked so as to cause the depression or latching downward of the related interposer. When magnet 142 is deenergized at 220° spring 168 restores the lever 143 (see timing No. 12). While only a few interposers have been shown, it is understood that twelve will be provided for each column to cause the actuation of the related interposer in the column. The above setup means is merely exemplary and other arrangements may be provided. For example, a single slidably mounted interposer selector may be provided to slide over to the group of interposers to select and then depress an interposer with the same result. It is pointed out that the data set up in the punch unit may come from any suitable source, such as a card, an accumulator, etc. in which cases electrical digit impulses will energize the selected magnet 142.

VERTICAL RECIPROCATION OF INTERPOSER UNIT

Figure 21:
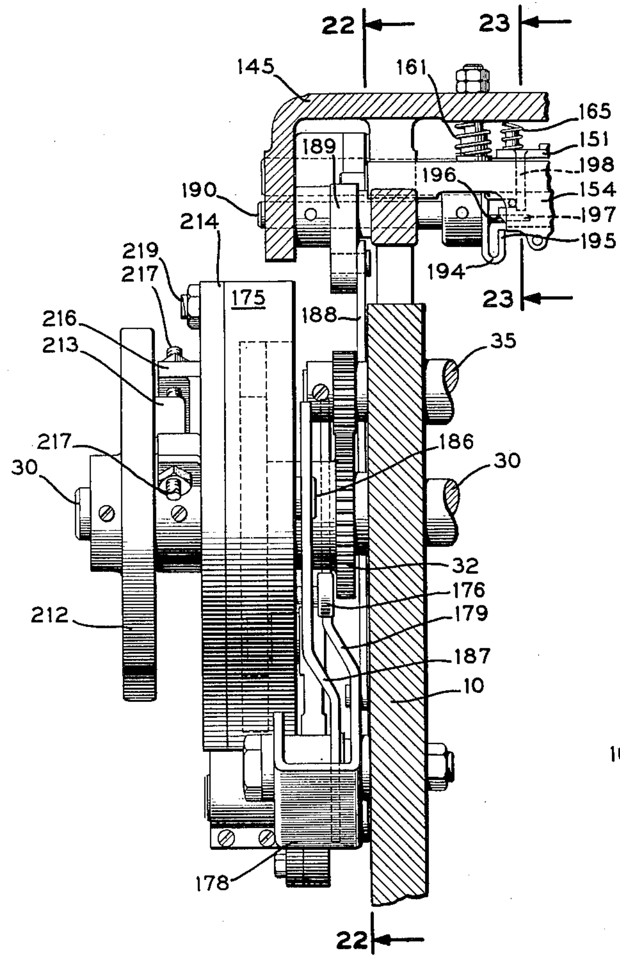
FIG. 21 is a view in elevation showing the main operating cam and the associated train of devices for effecting certain functional operations in the punch interposer unit.
Figure 22:
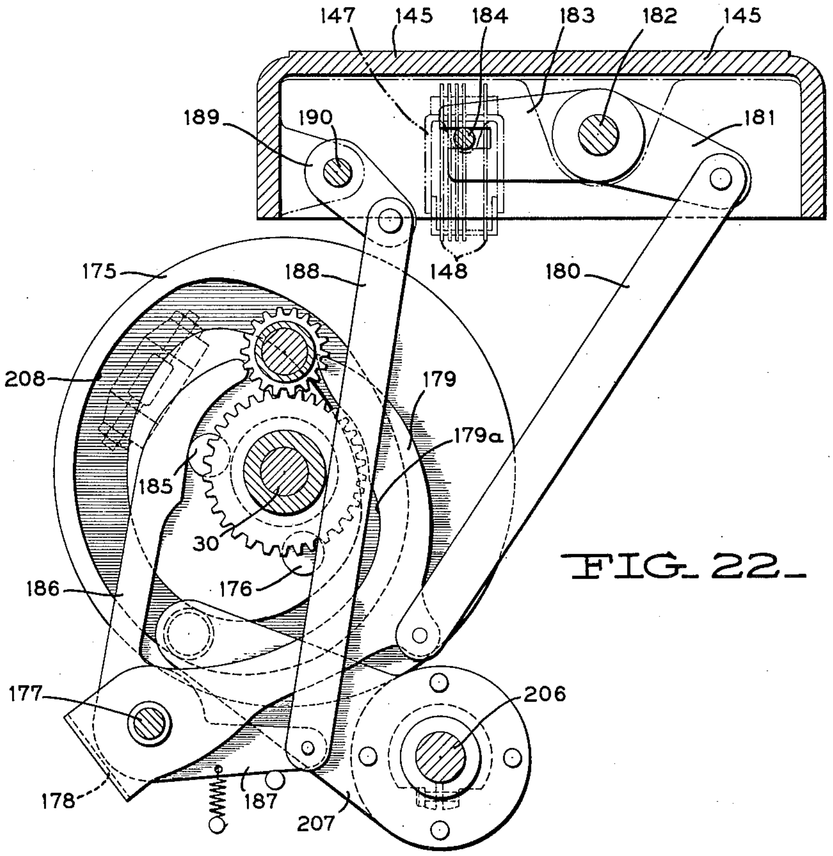
FIG. 22 is a sectional view taken on the line 22—22 of FIG. 21.

The means to raise the interposer unit 141 vertically from the position shown in FIG. 7 to cause the interposers 146 to engage the related levers 143 to effect their depression and latching is best shown in FIGS. 21 and 22.

A box cam 175 rotated by the feed roll shaft 30 carries on its side face a stud or roller 176 (FIG. 22). Loosely pivoted on a rod 177 fixed to the rear frame plate 10 is a U-shaped bail 178 having an integral upstanding cam shaped arm 179 in the plane of the roller 176. Pitman 180 attached to arm 179 (FIG. 22) connects the arm 179 to a rocker arm 181 secured to a rock shaft 182 which is journalled in the side plates of the top cover plate 145. To said rock shaft 182 there is attached a pair of arms 183 which are forked to receive the respective stud 184 carried at each end of the upper U-shaped frame 147 of the interposer unit 141 (see FIG. 7).

As shown in the timing diagram of FIG. 24 for timing No. 10, at 130° (for punching selected card columns 73—80) roller 176, as it rotates clockwise, engages the end of cam arm 179 camming it clockwise, pulling pitman 180 down, rocking arm 181 and shaft 182 clockwise and raising arms 183 and studs 184 to elevate the interposer unit to effect, as has been described, the transfer of data from the rocked levers 143 to the columns of the interposers 146.

At 220° of the machine cycle the roller 176 rides in a recess 179*a* of cam arm 179 to enable a reverse movement of the aforedescribed parts. The compressed interposer return springs 161 (FIG. 7) for the interposer unit depress the interposer unit between 220°–250° (see timing No. 10). The latched interposers 146 which now project lower than the non-selected interposers will depress the respective punches 80 (see FIG. 11) and cause the depressed punches to be latched by their respective latch plates 86. Because of the dwell period (220°–286°, timing No. 6) of the cam which causes the longitudinal reciprocation of the punch unit, as will be described, the punch unit remains stationary for a short time in the setup position permitting the interposer unit to be lowered during this time to set up the punches 80.

UNLATCHING INTERPOSERS

Immediately following the lowering of the interposer unit for setting up the punches 80 a similar operating mechanism is effective to unlatch the latched interposers 146. It will be evident that when said interposers are unlatched and elevated they and the remaining normal interposers will not interfere with the tops of the punches as the punch unit is subsequently reciprocated longitudinally.

Figure 23:
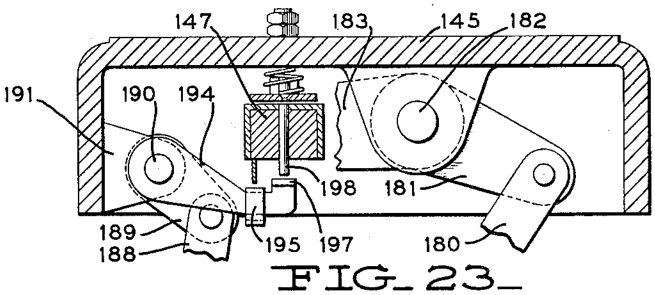
FIG. 23 is a sectional view taken on the line 23—23 of FIG. 21.

To this end box cam 175 (see FIGS. 21 and 22) carries on its face a second roller 185 which is in the plane of a bell crank arm 186—187, the arm 187 having a pitman connection 188 to a rock arm 189 which is secured to a rock shaft 190. Said shaft is journaled in brackets 191 (FIG. 23) carried by the cover plate 145. Fast to the rock shaft 190 is a pair of arms 194 (FIGS. 21 and 23), each having secured thereto means to elevate the interposer restoring plate 150. One of said arms 194 has a curved portion 195 (see FIGS. 7 and 21) which, as it is rocked, bears against a cam edge 196 of the interposer unlatching plate 154 and this cooperation is effective to shift unlatching plate 154 to unlatch the depressed interposers 146. Said arms 194 also have laterally extending lugs 197 (FIGS. 7, 21 and 23) underlying pins 198 secured to the plate 151 connected to the interposer restoring plate 150. Since the shoulders 159 of the depressed interposers now rest on the restoring plate 150 (see FIG. 11) the latter will be raised to positively restore the unlatched interposers 146.

Referring to timing No. 11 of FIG. 24, it will be seen that the roller 185 is effective to unlatch the latched interposers 146 and elevate the interposer restoring plate 150 between 250° to 288° and unlatch the interposers before 286°. During this period the punch unit is still at the setup position, and by unlatching the interposers the subsequent longitudinal reciprocation of the punch unit will not be interfered with. The interposer restore plate 150 is kept elevated until 10° of the next cycle, when it is restored by springs 165. This further insures the prevention of interference between the punches 80 and interposers 146.

MEANS FOR RECIPROCATING CARD PUNCH UNIT LONGITUDINALLY

The punch unit is capable of reciprocation longitudinally like a shuttle carriage and at a rate of movement which corresponds with the rate of card feed, whereby punching is effected in a plurality of eight columns or in any of these while the card is in motion. The punch unit comprises all the parts shown in the lower half of FIG. 8 which are assembled together to be longitudinally reciprocated as a unit by the slidable mounting previously described. It will be recalled that die block 60 has a pair of wedge-shaped integral rails 65 (see FIGS. 1, 4, 7 and 11), fitting in complementary diagonal slots in a pair of guide rails 66 which are secured to the insides of the rear frame plate 10 and the front frame plate 11. The tracks or rails 65 support not only the die block 60 but the entire punching mechanism and guide the punching mechanism as it is moved to the right and left for a reason to be explained hereinafter.

Figure 6:
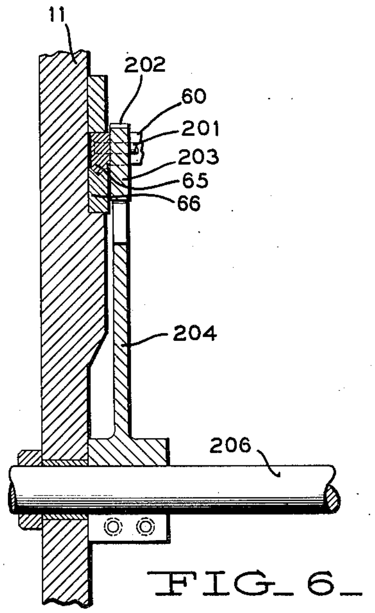
FIG. 6 is a sectional view taken on the irregular section line 6—6 of FIG. 4 showing one of the arms for reciprocating the card punch under control of the cam operated drive shown in FIGS. 4 and 5.
Figure 5:
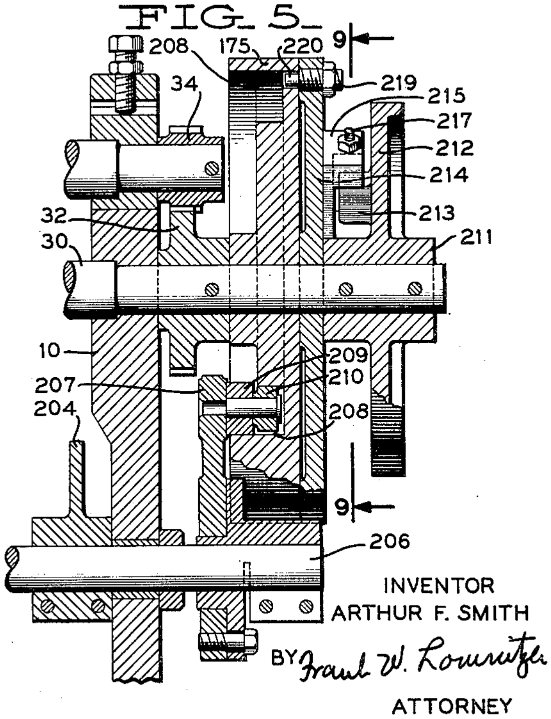
FIG. 5 is a sectional view taken on the irregular section line 5—5 of FIG. 4 which view shows in more detail the cam operated drive for reciprocating the punch unit.

The die block 60 is forked at 200 (see FIGS. 1, 2 and 4) at both the front and rear and projecting through the ears of the forked extension is a pin 201 on which is loosely mounted a rectangular block 202 received by the upper fork 203 of a respective arm 204. A pair of arms 204 (see FIGS. 5 and 6) is secured to a rock shaft 206 journaled in the frame plates 10 and 11. To the end of the shaft 206 which is outside the rear frame plate 10 there is secured a follower arm 207 (FIG. 5) cooperating with the cam race 208 of the box cam 175 previously mentioned. The follower arm 207 carries two cam rolls 209, 210 which are of different diameters as shown in FIG. 5. The larger cam roll 209 contacts the outside of the cam race 208 and the smaller cam roll 210 contacts the inside of the cam race. This arrangement is used to prevent directional change in the rotation of the follower rolls 209, 210. By means to be presently described the shaft 30 rotates said cam 175 a complete revolution for each operation of the machine and the cam race is designed to reciprocate the punching unit with the timing shown in No. 6 of FIG. 24.

Between 220° and 286° there is no longitudinal movement of the punch unit and during this dwell period the punches are set up, as previously explained. After 286° cam 175 causes the right-hand movement of the punch at a rate which coincides with the rate of card feed (see timing No. 4). At 4° of the next cycle the punch depressing mechanism shown in FIGS. 13–17 previously described is effective to depress the latched punches to cause punching in the group of columns 73—80 during the time the card is fed to the right. The right-hand movement of the punch continues to 75° of the punching cycle, and thereafter to 220° of the same cycle the punch unit is returned. Summarizing, it will be seen then that cam 175 permits the punching unit to be stationary for a short period to set up the punches while column 80 of the card is feeding to the punch, then move the punch unit to the right during which time selected punches are depressed to punch the card always at a common position of the punch unit while the card is in motion and moving at the same rate of speed as the punch unit; and then return the punch unit without an unwanted second depression of the selected punches, as previously described. Also, cam 175 is rotated by feed roller shaft 30 to reciprocate die block 60 and thereby the posts 72. Since the castings 75, 76 are slidable only in a vertical direction on posts 72, these castings and hence the studs 105, 106 will be reciprocated horizontally in unison with the die block 60.

PRECISION MEANS FOR EFFECTING PUNCHING AT CORRECT SPACES

Figure 9:
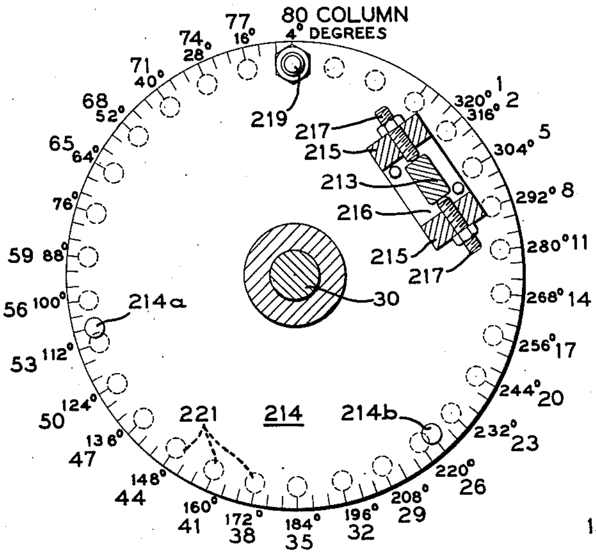
FIG. 9 is a sectional view taken on the line 9—9 of FIG. 5 showing the micrometer adjustment for an operating cam to insure punching at exact places, as well as the arrangement which includes a single connecting pin to select the group of columns to be punched.

The adjustable vernier connection between shaft 30 and cam 175 is best shown in FIGS. 5 and 9 and includes micrometer adjustable means to insure proper punching in the columns. The hub 211 of a driving disk 212 is pinned to shaft 30 and carries an ear or lug 213. Next to the hub 211 of the driving disk 212 there is loosely mounted on the shaft 30 an index disk 214 to which is secured a vernier block 216 having a pair of integral ears 215 through which threaded bolts or vernier screws 217 pass so as to contact each side of the ear or lug 213 (see FIG. 9). Into a threaded hole in the index disk 214 a threaded screw 219 is screwed which is of sufficient length to cause the end 220 of said screw (see FIG. 5) to project into the selected one of a series of holes 221 (FIG. 9) formed in the cam 175 and arranged in a circle. The purpose of this screw connection between index disk 214 and cam 175 will appear later. It is evident that by means of such connection the cam 175 is driven by the feed roll shaft 30.

It is well known that holes should be punched in the columns at exact positions in order to properly control statistical machines by the "IBM" form of punched cards, preferably employed herein. In the present machine the lug 213 of the cam driving disk 212 is a driving member for cam 175 which it will be recalled reciprocates the punch unit longitudinally. By means of the vernier screws 217 the time or the position that the column of a card is in when punching is effected by a row of punches may be conveniently altered and thus such vernier adjustment provides a precision means for correctly registering the selected card columns with the punches columnwise.

SETTABLE DEVICE TO SELECT GROUP OF COLUMNS TO BE PUNCHED

Figure 10:
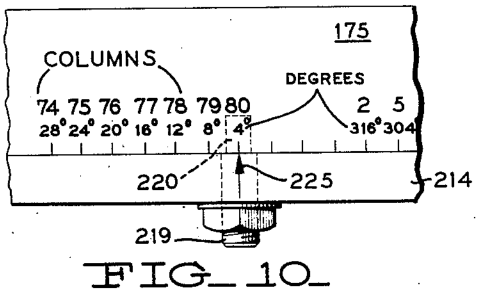
FIG. 10 is a plan view of part of the indicia on the periphery of an adjustable cam for showing the position of the connecting pin necessary to select columns to be punched.

Assuming that column 80 or any one of a group of eight columns 73–80 is to be punched, the cam 175 is manually turned relative to the index disk 214 so that index line 225 on index disk is adjacent the indicia $$\frac{\text{"80"}}{4^\circ}$$

as shown in FIG. 10. The screw 219 is passed through the threaded hole in the index disk 214 and into the hole 221 in the cam which is aligned with $$\frac{\text{"80"}}{4^\circ}$$

Hence, at 4° of the cycle, punching will be effected on the card in a group of columns 73–80 as previously described. Hereafter, when it is stated that a certain column is selected the selection includes seven columns of a group which are lower numbered. Thus, selection of column 80 includes numbered columns 73–79.

It is desirable that other selected columns or groups of columns of the card be punched and for simplicity it will first be assumed that column 77 is to be punched. This requires turning of the cam 175 clockwise (FIG. 9) to bring the indicia $$\frac{77}{16^\circ}$$

in alignment with the index line 225. This, however, does not alter the rate of speed of the card feeding means and only the six functions of the timing in Nos. 6–11 inclusive shown in FIG. 24 are changed. Hence, all operations effected by cam 175 will be delayed 12°, and punching will occur later at 16° in the cycle instead of 4° for punching column 80. The effect of this is to permit feeding of the card three additional columns to the right before the punch depressing mechanism is effective to punch column 77. It is evident that the insertion of screw 219 to the next hole 221 at the left is to always delay the timing of the punch depressing mechanism 12° with respect to the rate of card feed, and since the latter is not altered (index disk 214 remaining fixed) the timing of the depression of the punches selects the column to be punched. Of course, the operation of the selectors (timing Nos. 12 and 13) for the interposers is also delayed to occur during the dwell time, which for column 77 punching occurs 12° later or between 236° and 302° in the previous cycle.

The selection of column 80, and decreasing by every three columns, such as columns 77, 74, 71 down to column 2 in the above described manner provides an increased amount of time for feeding the card to the card punch unit since the longitudinal movement and punching operation of the punch unit are increasingly delayed and therefore permits additional columns to be fed over the punch unit until the selected column is at the punches the instant that the punch depressing mechanism is effective, at which time both the punch unit and card are moving together at the same rate. Again, a group of seven lower numbered columns can be selected by selecting the highest numbered column on the cam 175. This is true for columns 80 down to column 8, because the selection of column 8, for example, will cause punching of the seven lower numbered columns 7, 6, 5, 4, 3, 2 and 1.

The first set of feed rolls driven by shafts 30 and 35 (FIG. 2) effects feeding of the card to the punch unit up to 149° (see timing No. 4, FIG. 24) which takes care of punching down to column 44. However, the additional extent of feeding of the card necessary for punching columns below 44 is provided by the second set of feeding rolls driven by shafts 23 and 40 (FIG. 2) which start to be active at 148° (see timing No. 5 of FIG. 24).

The longitudinal movement of the punch unit and depression to punch column 1 which is at the extreme left or trailing edge of the card are delayed the maximum amount, since the card is fed almost its entire length before the punch depression is effected to punch column 1. Conversely the longitudinal movement of the punch unit and depression to punch column 80 is delayed the least extent and occurs earliest in the cycle since column 80 is the leading edge of the card. For lower numbered card columns there is a gradual increasing delay in the operations of the punch unit; the rate of card feed by either set of rolls always being constant. The rate of card speed is the same as the longitudinal reciprocation of the punch unit irrespective of the extent of delay of the operation of the punch depressing mechanism.

The above describes column selection for column 80 and the lowered number columns decreasing by three, such as columns 77, 74, 71, 68, etc. down to column 2. However, columns intermediate each three should also be capable of being selected for complete utilization of the card. If it were possible and still have a strong structural connection between cam 175 and index disk 214 two extra holes at 8° and 12° (columns 79 and 78) could, for example, be placed in the cam 175 to select intermediate columns 79, 78 and similarly between other adjacent holes in the cam 175. To do so would require too many holes and either screws 219 which would be too small structurally, or an undesirable size of disk 214 and cam 175 for large holes. To this end, as a better and preferred construction, there is formed in the index disk 214 two extra threaded interpolating holes 214A and 214B. Hole 214A is for selection of a hole one less than the highest numbered column adjacent a hole in the cam 175, and 214B is for selection of a column two less than the highest numbered column adjacent a hole in cam 175. Thus, to select column 79 the threaded screw 219 is removed from the position shown in FIG. 9. The cam 175 is then turned clockwise the extent of one mark until said mark corresponding to column 79 is adjacent the index line 225. The screw 219 is now screwed into threaded hole 214A and into the hole in cam 175 designated 53–112°. Both the index disk 214 and cam 175 are now joined together and provide the required relationship to select column 79, and the seven lower numbered columns 78–72. If column 76 is to be selected index line 225 is adjacent the first mark away from 77 and the screw 219 would be placed in the cam hole adjacent 50–124°.

This same manner of operation is carried out for selection of a column one less than the columns adjacent the holes in cam 175. Use of the threaded hole 214A also permits the selection of columns 7, 4 and 1 (when used singly) which are one lower than columns 8, 5, and 2, respectively.

There remains to be described the selection of the intermediate columns 78, 75, 72 . . . 6, 3, the column numbers just designated being two digits away from the highest column number where there is a hole in cam 175. The selection of these intermediate columns is effected in a similar manner, that is, the removal of the screw 219 from the hole aligned with the indicia $$\frac{\text{"80"}}{4°}$$

and threading said screw into the hole 214B of the index disk 214. The threaded hole 214B is two spaces away from column 23–232° when the parts are as shown in FIG. 9. When this adjustment is made to select column 78, the seven lower numbered columns 77–71 inclusive will be selected for punching. The selection of other columns, such as 75—72 is effected by a greater clockwise turning of the cam 175 from the position shown in FIG. 9 in order that the screw 219 passing through threaded hole 214B will enter the proper hole in the cam 175. The use of the threaded hole 214B also permits the selection of individual columns 6 and 3 which are two lower than columns 8 and 5. The cam is rotated clockwise from the position shown in FIG. 9 until either of the columns numbers 6 or 3 is aligned with the index line 225 in order that the screw passing through the threaded hole 214B will enter the proper holes in the cam 175 to connect the index disk 214 and cam 175 together.

If so desired eighty holes may be made in the cam 175 if it is large enough in diameter in which case only a single threaded screw hole for screw 219 in disk 214 will be necessary. However, the form of selector utilizing interpolating holes 214A and 214B is preferred since only 30 holes in the cam 175 plus three threaded holes in the disk 214 are required. This arrangement does not weaken the structural strength of the cam disk 175 and permits the utilization of large threaded screws 219 to effect a good strong connection between the cam disk 175 and index disk 214.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a record punching machine for punching a record in motion, the combination of a punch unit carrying a plurality of rows of punches and having a rest position, a support for supporting the punch unit, means for initially depressing selected punches at said rest position of said punch unit without punching the record, cam means for driving said support and for moving said punch unit and said punches, means for feeding a record to said punches at the rest position of said punch unit a predetermined extent to correlate a selected area of said record comprising a plurality of columns with the punches, and thereafter synchronously with the punch unit, means to effect the automatic further depression of selected punches when said punch unit and record are both in synchronous motion, whereby said record is punched while in motion, and means for modifying the time of operation of said feeding means with respect to the time of operation of the last named punch depressing means to vary the extent of feeding of the card to said punches to select different areas to be punched.

2. In a record punching machine for punching a plurality of columns of a record while in motion, the combination of a punch unit carrying a plurality of rows of punches and having a rest position, support means for supporting said punch unit, means for depressing selected punches at said rest position of said punch unit, cam means for moving said support means and for moving said punch unit and said punches, means for feeding a record to said punches at the rest position of said punch unit to correlate a plurality of columns of said record with a corresponding number of rows of punches, and thereafter feeding said record synchronously with the movement of the punch unit, and means to effect the automatic further depression of said selected punches when said punch unit and record are both in synchronous motion, whereby said record is punched in a plurality of columns while in motion.

3. In a punching machine for punching a plurality of columns of a record at a selected area, a plurality of rows of punches, means for feeding a record to correlate an area comprising a predetermined number of columns of the record with said punches, means for effecting a punching operation from said rows of punches, and selective means for timing the operation of said punching means to enable said feeding means to feed the record different predetermined amounts as determined by the selection means with respect to said punches to correlate selected areas of the record to be punched with said punching means.

4. In a punching machine for punching a plurality of columns of a record at a selected area, a plurality of rows of punches, means for feeding a record to correlate an area comprising a predetermined number of columns of the record with said punches, means for effecting punching operation from said rows of punches, and selective means for initiating the operation of said punching means at different times in the operation of the machine to enable said feeding means to feed the record a predetermined amount as determined by the selective means with respect to said punches to correlate selected areas of the record to be punched with said punches.

5. In a punching machine for punching a plurality of columns of a record at a selected area, a plurality of columns of punches which are less than the number of columns of the record, means for feeding a record the least extent to correlate an area comprising a predetermined number of columns of the record with said punches, means for effecting punching operations from said rows of punches, and means for delaying the operation of said punching means with respect to the operation of said feeding means to enable said feeding means to feed the record a predetermined amount as determined by the selective means with respect to said punches prior to the punching operation to correlate other selected columns of the record to be punched with said columns of punches.

6. In a punching machine, a reciprocable punch unit carrying at least one row of punches, a cam for reciprocating said punch unit, means for effecting the depression of said row of punches during the reciprocation of said punch unit, record feeding means for initially feeding a record to position a selected column of the record to said rows of punches, a shaft for rotating said cam and for operating said feeding means, and means for changing the angular relationship between said cam and said shaft to select the time for initiating the operation of said reciprocating means.

7. In a punching machine, a reciprocable punch unit carrying at least one row of punches, a cam for reciprocating said punch unit, means operating solely by the reciprocation of the punch unit for effecting the depression of said row of punches during the reciprocation of the punch unit, record feeding means for initially feeding a record to position a predetermined column of the record to said rows of punches, a shaft for rotating said cam and for operating said feeding means, and means for changing the angular relationship between said cam and said shaft to control the time of initiation of the operation of said punch reciprocating means without altering the time of operation of the record feeding means by said shaft.

8. In a punching machine, a reciprocable punch unit carrying at least one row of punches, a cam, means controlled by said cam for effecting the depression of said row of punches to punch a record, record feeding means for initially feeding a record to said rows of punches to position a predetermined column of the record beneath said punches, a shaft for operating said feeding means and for rotating said cam, a disk rotated by said shaft, a disk rotated by said cam, and means comprising a single pin connection between said disks for changing the angular relationship between said cam and said shaft to decrease the extent of feeding of the record from said predetermined column to select other columns of the record to be punched.

9. In a punching machine, the combination of a vertically reciprocable interposer unit, a plurality of rows of interposers carried thereby adapted to receive a data setting, a vertically reciprocable punch unit, a corresponding number of rows of punches carried by said punch unit, means for reciprocating said interposer unit vertically to receive a data setting and to depress corresponding punches, and means for reciprocating said punch unit vertically to cause depressed punches to effect punching of a record.

10. In a punching machine, the combination of a vertically reciprocable interposer unit, a plurality of rows of interposers carried thereby adapted to receive a data setting, a longitudinally movable and vertically reciprocable punch unit, a corresponding number of rows of punches carried by said punch unit, means for reciprocating said interposer unit vertically to receive a data setting and to depress corresponding punches, means for moving said punch unit longitudinally to a record punching position, and means for automatically reciprocating said punch unit vertically at said record punching position to cause depressed punches to effect punching of a record.

11. In a punching machine, the combination of a vertically reciprocable interposer unit, a plurality of rows of interposers carried thereby, a plurality of rows of data representing selectors, a vertically reciprocable punch unit, a corresponding number of rows of punches carried by said punch unit, means for reciprocating said interposer unit vertically to cause said rows of selectors to select related interposers to represent the data setting and to cause said selected interposers to depress corresponding punches, and means for reciprocating said punch unit vertically to cause depressed punches to effect punching of a record.

12. In a punching machine, the combination of a punching unit, a plurality of rows of depressible elements, each of said elements having a projection, return springs for said elements, a restoring plate co-extensive with said rows of elements underlying the projections of depressed elements, means for latching depressed elements, and common operating means for disabling said latching means to cause said springs to return the latched elements and for causing the movement of said restoring plate against the projections of latched elements to positively restore the depressed and unlatched elements.

13. In a punching machine, the combination of a punching unit, a plurality of rows of depressible punches, each of said punches having a lug, return springs for said punches, a restoring plate against which the lugs of depressed punches abut, means for latching depressed punches, and common operating means for disabling said latching means to cause said springs to return the latched punches and for causing the movement of said restoring plate against which the lugs of latched punches abut to positively restore the depressed punches.

14. In a punching machine, the combination of a group of punch selectors, return springs therefor, means for latching said selectors which represent a data setting, a group of punches, means for latching said punches, return springs for said punches, means for moving said latched punch selectors against said punches to depress related punches to be latched by said punch latching means, means for disabling the latching means for the latched selectors after said latched selectors have depressed related punches, means for moving the latched punches to punch a record, and means operable after the record punching operation for disabling the latching means for said latched punches.

15. In a punching machine, the combination of a group of punch selectors, means for latching said selectors which represent a data setting, a group of punches corresponding to the group of selectors, a die for said punches, means for latching said punches, means for moving said latched punch selectors against said group of punches to depress related punches to be latched by said punch latching means, means for disabling the punch selector latching means to unlatch the latched selectors after said latched selectors have depressed related punches, means for moving the latched punches in said die further than their depression by said selectors to punch a record, and means operable after the record punching operation for disabling the punch latching means.

16. In a punching machine, the combination of a reciprocating punch unit having a rest position for setting up data, a plurality of rows of punches carried by said unit, a corresponding number of rows of interposers, means for depressing selected interposers in each row at the rest position of said unit to depress corresponding punches, leaving punches in each row unpressed and capable of striking depressed interposers in another row during the reciprocation of said punch unit, and means for positively restoring said depressed interposers before the reciprocation of said punch unit to prevent unpressed punches in one row from striking the depressed interposers in another row.

17. In a punching machine, the combination of a reciprocated and depressible punch unit having a rest position for setting up data, a plurality of rows of punches carried by said unit, a corresponding number of rows of interposers, means for depressing selected interposers in each row at the rest position of said unit to depress corresponding punches, leaving punches not depressed in each row capable of striking depressed interposers in another row during the reciprocation of said punch unit, means for moving said unit from said rest position, means for effecting depression of said punch unit when said unit has been moved to cause depressed punches to effect punching of a record, and means for positively restoring said depressed interposers prior to the movement of said punch unit to prevent punches not depressed in one row from striking the depressed interposers in another row.

18. In a punching machine, the combination of a reciprocating punch unit having a rest position for setting up data, a plurality of rows of punches carried by said unit, a corresponding number of rows of interposers, a vertically reciprocable unit carrying said interposers, a plurality of rows of data selector means, means for moving said interposer unit in one direction against said selectors for depressing corresponding interposers in each row at the rest position of said unit and in another direction against said punches to depress corresponding punches, leaving punches not depressed in each row capable of striking depressed interposers in another row during the reciprocation of said punch unit, and means for positively restoring said depressed interposers before the reciprocation of said punch unit to prevent punches not depressed in one row from striking the depressed interposers in another row.

19. In a punching machine, a punch unit having end portions and carrying a plurality of rows of punches selected for depression at a rest position of said punch unit, means for automatically reciprocating said punch unit to position said punch unit for punching operations, means for depressing said punches at said rest position of the punch unit to represent data, and stationary means engaging said end portions to support said punch unit and lock it during the depression of said punches.

20. In a punching machine, a punch unit having end portions and carrying a plurality of rows of punches, said punch unit having a rest position, a vertically reciprocable position, and a restoring position, means for moving said punch unit to each of said positions successively, a stationary cam block, said block having means to engage said end portions for normally locking the punch unit at its rest position, a recess to permit vertical movement of said punch unit, and a cam engaging said end portions of said block to positively cam said punch unit to normal restored position, and means to reciprocate said punch unit at said vertically reciprocable position to cause said punches to punch a record.

21. In a punching machine for punching records, a carrier for supporting punches, a die block resiliently supporting the carrier, means for selecting certain of the punches for punching a record, actuator means for driving the punch carrier through an arcuate path toward the path of the record, and feed means for feeding a record synchronously with the carrier and die block so that the selected punches perforate the record during a portion of the arcuate path of the carrier.

22. In a machine for marking a moving element, the combination of a plurality of marking members, support means for the members, presetting means for moving selected ones of the members a predetermined distance relative to the support means and toward the element, one means for advancing the element in a predetermined path, other means for moving the support means and hence all said members parallel to a straight portion of said path, actuator means for moving said support means at right angles to said portion and toward the element during operation of said other means such that the axes of said members always are disposed at right angles to said portion, and means for synchronizing the operation of said one means and other means and actuator means to cause the selected members to contact and mark a preselected area of the element while traveling at substantially the speed at which the element is advancing along said straight portion.

23. The combination according to claim 22, wherein said plurality of marking members comprises members arranged in columns and rows in phalanx-like fashion, and all selected members in the various columns and rows of such phalanx simultaneously mark the element.

24. In a machine for marking a moving element, the combination of one means for moving the element in a defined path, a bail, a plurality of marking members operably carried by the bail, means for latching preselected ones of the members in a depressed position relative to the bail, and other means for moving the bail concurrently laterally and downwardly toward a straight portion of said path such as to continually maintain the axes of the marking members disposed at right angles to the straight portion and move the preselected members into marking contact with the element at a time when the bail is concurrently moving all said members with a longitudinal component of speed substantially equal to that at which the element moves along said straight portion.

25. The combination according to claim 24, wherein said other means comprises another member, connecting means permitting movement of the bail toward said other member while constraining said bail and other member to move longitudinally in unison, means for reciprocating said other member and bail in a path parallel to said straight portion, and means for camming said bail successively toward and then away from said other member as said bail moves reciprocally in the same direction as the element.

26. The combination according to claim 25, wherein said camming means includes a projection secured to said bail for reciprocation therewith, two levers laterally spaced and rocked relative to a fixed support by and upon reciprocation of said projection such that as said projection moves in said direction it will cause the two levers to move initially in unison and depress said projection and bail until the element is marked, stop means for thereafter preventing further rocking of one of said levers while the other lever continues to be rocked by said projection to create a space between said levers and release the depressing thrust on the projection, resilient means thereupon effective to operatively bias the bail away from said other member, and including restoring means movable relative to the marking members for unlatching same to positively retract same from depressed position, said projection being effective to act through said other lever to maintain said restoring means in unlatching position until the one lever is disengaged from said stop means.

27. In a machine for marking a moving element, the combination of one means for advancing the element along a predetermined path having a straight portion, a plurality of parallel-arranged marking members, support means supporting the members for movement independently of each other, means for displacing selectable ones of said members relative to the remaining members, means for latching the selected members in their displaced positions, other means for thereafter moving said support means and thereby all of said members concurrently sidewise and toward said element such that the axis of each member always is disposed at right angles to said portion as the members concurrently move toward the element at said portion and advance along with the element, and means coordinating the operation of said one means and other means and displacing means to cause a selected area of the element to be marked only by the selected members and while all members have a longitudinal component of speed substantially equal to the speed the element is advancing along said straight portion.

References Cited in the file of this patent

UNITED STATES PATENTS

| | | |
|---|---|---|
| 2,160,152 | Kalley | May 30, 1939 |
| 2,228,162 | Benham et al. | Jan. 7, 1941 |
| 2,395,557 | Leathers | Feb. 26, 1946 |
| 2,648,385 | De Boo | Aug. 11, 1953 |
| 2,761,513 | Stram | Sept. 4, 1956 |